US007315807B1

(12) United States Patent
Lavallee et al.

(10) Patent No.: US 7,315,807 B1
(45) Date of Patent: Jan. 1, 2008

(54) SYSTEM AND METHODS FOR STORAGE AREA NETWORK SIMULATION

(75) Inventors: James E. Lavallee, Boylston, MA (US); Sean P. Frazer, Westford, MA (US); Alexander Dubrovsky, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 505 days.

(21) Appl. No.: 10/954,015

(22) Filed: Sep. 29, 2004

(51) Int. Cl.
*G06F 13/10* (2006.01)
*G06F 10/13* (2006.01)

(52) U.S. Cl. .......................... 703/21; 703/22; 703/23; 703/24; 703/25; 711/114; 711/111; 711/168; 711/173; 709/227; 709/213

(58) Field of Classification Search ................ 711/173, 711/168, 114; 707/102, 204; 714/741, 6, 714/743; 703/24
See application file for complete search history.

(56) References Cited

U.S. PATENT DOCUMENTS

| 6,421,723 | B1 * | 7/2002 | Tawil .......................... 709/224 |
| 6,715,031 | B2 * | 3/2004 | Camble et al. .............. 711/111 |
| 6,898,670 | B2 * | 5/2005 | Nahum ........................ 711/114 |
| 6,915,448 | B2 * | 7/2005 | Murphy et al. ................. 714/6 |
| 7,114,112 | B2 * | 9/2006 | Griffin et al. ................ 714/741 |
| 7,162,604 | B1 * | 1/2007 | Nourmohamadian et al. ........................... 711/168 |
| 2002/0161971 | A1 * | 10/2002 | Dimitri et al. ............... 711/114 |
| 2003/0041283 | A1 * | 2/2003 | Murphy et al. ................ 714/13 |
| 2003/0126396 | A1 * | 7/2003 | Camble et al. .............. 711/173 |
| 2003/0236945 | A1 * | 12/2003 | Nahum ........................ 711/114 |
| 2004/0010660 | A1 * | 1/2004 | Konshak et al. ............ 711/114 |
| 2004/0260993 | A1 * | 12/2004 | Griffin et al. ................ 714/743 |
| 2004/0267516 | A1 * | 12/2004 | Jibbe et al. .................... 703/24 |
| 2005/0065961 | A1 * | 3/2005 | Aguren ........................ 707/102 |
| 2005/0228835 | A1 * | 10/2005 | Roa ............................. 707/204 |

OTHER PUBLICATIONS

Xavier Molero et al.☐☐A Tool for the Design and Evaluation of Fibre Channel Storage Area Networks☐☐IEEE 2001, pp. 133-140, 0-7695-1092-2/01.*

* cited by examiner

*Primary Examiner*—Kamini Shah
*Assistant Examiner*—Cuong Van Luu
(74) *Attorney, Agent, or Firm*—Chapin IP Law, LLC; Barry W. Chapin, Esq.

(57) ABSTRACT

A storage area network simulator, operable to simulate an exchange of calls emanating from a SAN management application to a plurality of manageable entities, allows analyzing SAN management application response to a particular configuration. A capture tool discovers manageable entities interconnected in a particular SAN experiencing undesirable operation. The capture tool provides exemplary calls to an agent, and gathers responses. The exemplary calls enumerate expected responses from the various manageable entities responsive to the agent. The gathered responses take the form of an XML markup script. A simulation plug-in is operative as an interface module (e.g. plug-in) for a test agent in a test environment, such as the management application test facility. The test agent employs the simulation plug-in as the API plug-in for calls emanating from the test agent. The plug-in receives the normalized responses, and selectively transmits the corresponding response from the gathered normalized responses in response to agent calls received via the API.

18 Claims, 7 Drawing Sheets

SYSTEM AND METHODS FOR STORAGE AREA NETWORK SIMULATION

BACKGROUND OF THE INVENTION

Conventional managed information environments typically include a plurality of interconnected manageable entities, or nodes. In such an environment including a storage area network (SAN), the manageable entities may include storage arrays, connectivity devices and host entities, collectively operable to provide information storage and retrieval services to users. In a large storage area network, the number of nodes may be substantial.

In such a storage area network, software entities known as agents are responsive to a management application for managing the nodes in the SAN. The agents typically execute on a host computer and are in communication with manageable entities in the SAN responsive to the agent for providing configuration and status information, and for receiving instructions. In a typical conventional SAN, the agents manage and monitor a variety of manageable entities having different functions, and often from different vendors. Further, connectivity, equipment changes and maintenance may affect the presence and status of the various manageable entities. Therefore, the configuration of the SAN may be complex and dynamic.

Accordingly, the SAN may adapt agents to a particular configuration in the SAN. The agents may be responsible for general tasks of a large number of nodes or manageable entities, or may have a more specialized role in handling a smaller number of specialized or vendor specific manageable entities. Nonetheless, the agent is communicative with the manageable entities for which it is responsible. Accordingly, conventional SAN agents typically employ an application programming interface (API) conversant with a particular manageable entity and operable to manage and monitor the manageable entity.

SUMMARY

In a storage area network, agents typically manage and monitor a plurality of manageable entities, or resources, by employing an application programming interface (API) known to both the agent and the manageable entity. As a typical conventional agent may manage multiple manageable entities, or manageable resources, an agent may employ a particular API specific to each manageable resource or type of manageable resource which it manages. Often, such conventional APIs are specific to a particular vendor of the type of manageable resource concerned. For example, a conventional SAN often employs a plurality of connectivity devices, or switches, between hosts and storage arrays. The switches manage the ports which physically interconnect the hosts and storage arrays for delivering data from the storage arrays to users. A typical agent may be a switch agent operable to manage a plurality of switches, each from a different vendor. Therefore, the agent employs a particular device specific API corresponding to the switch of each vendor.

An agent, therefore, may employ an API having a set of interface modules, or so-called "plug-ins," each adapted to the switch of each particular vendor. Each plug-in, therefore, is operable between the agent and the particular switch. The plug-ins are operable to share a common set of commands or instructions (i.e. parameters) with the API, and communicate in vendor specific parameters on the switch side. Each API typically employs multiple plug-ins to cover the switches which it manages. For each call to a switch, therefore, the API selectively employs the corresponding plug-in specific to the switch.

As indicated above, the number and arrangement of manageable entities in a SAN may be formidable. In the case of the switch agent, for example, the permutations and combinations of switches managed by a host (i.e. by agents on the host) results in a complex configuration of various types of switches. Often, however, operational or performance issues may arise at a particular configuration site. Such performance issues, for example, may be due to approaching a limit of configured manageable entities, creating a bottleneck or similar contention. Typically, a customer operating the configuration seeks technical support for resolution. However, the symptoms observed by the customer may be due to the configuration at the customer site, rather than by equipment failure. Accordingly, it may be difficult to recreate the circumstances resulting in the observed performance issues and/or symptoms.

Configurations of the invention are based, in part, on the observation that customer reported symptoms of undesirable manageable resource operation may be difficult to recreate in a diagnostic setting, such as in a SAN management application test and development facility. Accordingly, it would be beneficial to provide a storage area network simulation operable to simulate a given configuration, such as a particular number of switches, without physically reproducing a large physical interconnection representing the configuration, to allow observation and analysis of a particular SAN configuration under load.

Configurations of the invention substantially overcome the above described shortcomings with respect to observing configuration symptoms of large installations by providing a storage area network simulator operable to simulate an exchange of calls emanating from a SAN management application to a plurality of manageable entities, or resources, such as switches, for observing and analyzing SAN management application responses to a particular configuration. A capture tool discovers manageable entities interconnected in a particular SAN, such as the SAN experiencing undesirable operation. The capture tool delivers a range of exemplary calls to an agent, and gathers responses. The exemplary calls enumerate expected responses from the various manageable entities responsive to the agent. The gathered responses take the form of a normalized file, such as an XML markup script.

The simulator interfaces with the test agent as an API plug-in, thereby providing a simulation transparent from outside the API. An emulator plug-in is operative as an interface module (e.g. plug-in) for a test agent in a test environment, such as a management application test facility. The test agent is adapted to employ the emulator plug-in as the API plug-in for calls emanating from the test agent. The emulator plug-in receives the normalized responses, and selectively transmits the corresponding response from the normalized responses in response to the corresponding agent call received via the API. Further, the emulator plug-in receives additional configuration data from the capture tool, such as timing information to enable the emulator responses to occur at substantially similar intervals as their counterparts in the symptomatic configuration.

In further detail, the method of simulating nodes in a storage area network includes receiving a call destined for a managed resource, in which the managed resource corresponds to a particular interface module in an agent, and directing the received call to a simulator interface module, in which the simulator interface module is operable to present an image of a plurality of vendor specific managed resources. The simulator interface module determines a corresponding response message to the received call from a plurality of predetermined responses, previously gathered from actual managed resource calls, as well determining latency of the response, and returns the determined response message corresponding to the received call.

The simulation agent employs a gatherer for generating the plurality of predetermined responses, in which the predetermined responses are responsive to API calls made by an agent to each of a plurality of vendor specific managed resources by exercising a corresponding interface to each of the managed resources. In the exemplary configuration shown, the managed resource is a switching device (i.e. switch) and directing the received call further includes simulating an interface module in communication with the agent, redirecting the identified switch destined calls from the agent to the simulation interface module, and intercepting the redirected calls by the simulated interface module.

The simulator interface module therefore simulates a vendor specific interface module, in which the simulating is performed by the simulator interface module in a vendor agnostic manner. In the illustrated configuration, the interface modules are plug-ins operable for communication with the agent via the API, in which each of the plug-ins corresponding to a particular managed object and coupled to the API. Such plug-ins, as are known in the art, are software entities which may optionally be included in a larger software entity as an interface or adapter to a particular device, such as a switch or other manageable resource. Further, the simulator interface module is itself another interface plug-in, adapted for integration with the API. The API is configured to redirect calls destined for a switch to the simulator interface module plug-in, in which the simulator interface module plug-in is operable to emulate a switch by providing predetermined responses corresponding to the redirected calls. Such redirecting further includes directing the API to invoke the simulator interface module plug-in for calls corresponding to switches.

In particular configurations, identifying the managed object calls further includes periodically polling the simulator plug-in (i.e. interface module) and receiving responses as a result of the polling. Further, the simulator interface module may be in communication with an interface process for sequencing of multiple agents to the same switch The simulation agent employs a gatherer for establishing the predetermined responses, in which the gatherer identifies calls made by an agent to a responsive node (e.g. a switch), in which the agent is operable to control the responsive node, and receives, from the responsive node, messages in response to the calls. The gatherer then stores the response messages in a normalized form operable for retransmission as the corresponding determined response message to simulate actual responses from the managed resources. In the exemplary configuration, the normalized form further comprises a markup language conforming to a predetermined syntax, such as XML (Extensible Markup Language), and simulation may further include modifying the normalized form of the stored responses prior to retransmission.

The received call corresponds to one of a plurality of predetermined switch calls in the storage area network, in which the predetermined switch calls are operable to identify configuration attributes of the switch, and are typically gathered periodically from the switch during normal operation to identify and/or detect and implement status and configuration issues. The configuration attributes concerned may further include one or more of the storage area network layout, connectivity, and the configuration of the switch.

Further, gathering the responses, in particular configurations includes identifying the latency corresponding to a predetermined response, and adjusting the predetermined response according to the latency.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that, when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

In a large storage area network at a customer site, customer reported symptoms of undesirable managed object operation may be difficult to recreate in a diagnostic setting, such as in a SAN management application test and development facility. A storage area network simulation operable to simulate a given configuration, such as a particular customer installation, allows observation and analysis of a particular SAN configuration under load, and also allows a maintenance engineer to analyze problems and develop and test remedial procedures, without physically reproducing such a large physical interconnection.

A storage area network simulator, disclosed further below, is operable to simulate an exchange of calls emanating from a SAN management application to a plurality of manageable entities, such as switches, for observing and analyzing SAN management application response to a particular configuration. A capture or gathering tool discovers manageable entities interconnected in a particular SAN, such as the SAN experiencing undesirable operation. The gatherer delivers a range of exemplary calls to an agent, and gathers responses. The exemplary calls enumerate expected responses from the various manageable entities responsive to the agent. The gathered responses take the form of a normalized file, such as an XML markup script. An emulator plug-in is operative as an simulator interface module (e.g. plug-in) for a test agent in a test environment, such as the management application test facility. The test agent is adapted to employ the emulator plug-in as the API plug-in for calls emanating from the test agent. The emulator plug-in receives the normalized responses, and selectively transmits the corresponding response from the normalized responses in response to the corresponding agent call received via the API. Further, the emulator plug-in receives additional configuration data from the capture tool, such as timing information such that the emulator responses occur at substantially similar intervals as their counterparts in the symptomatic configuration.

Figure 1:
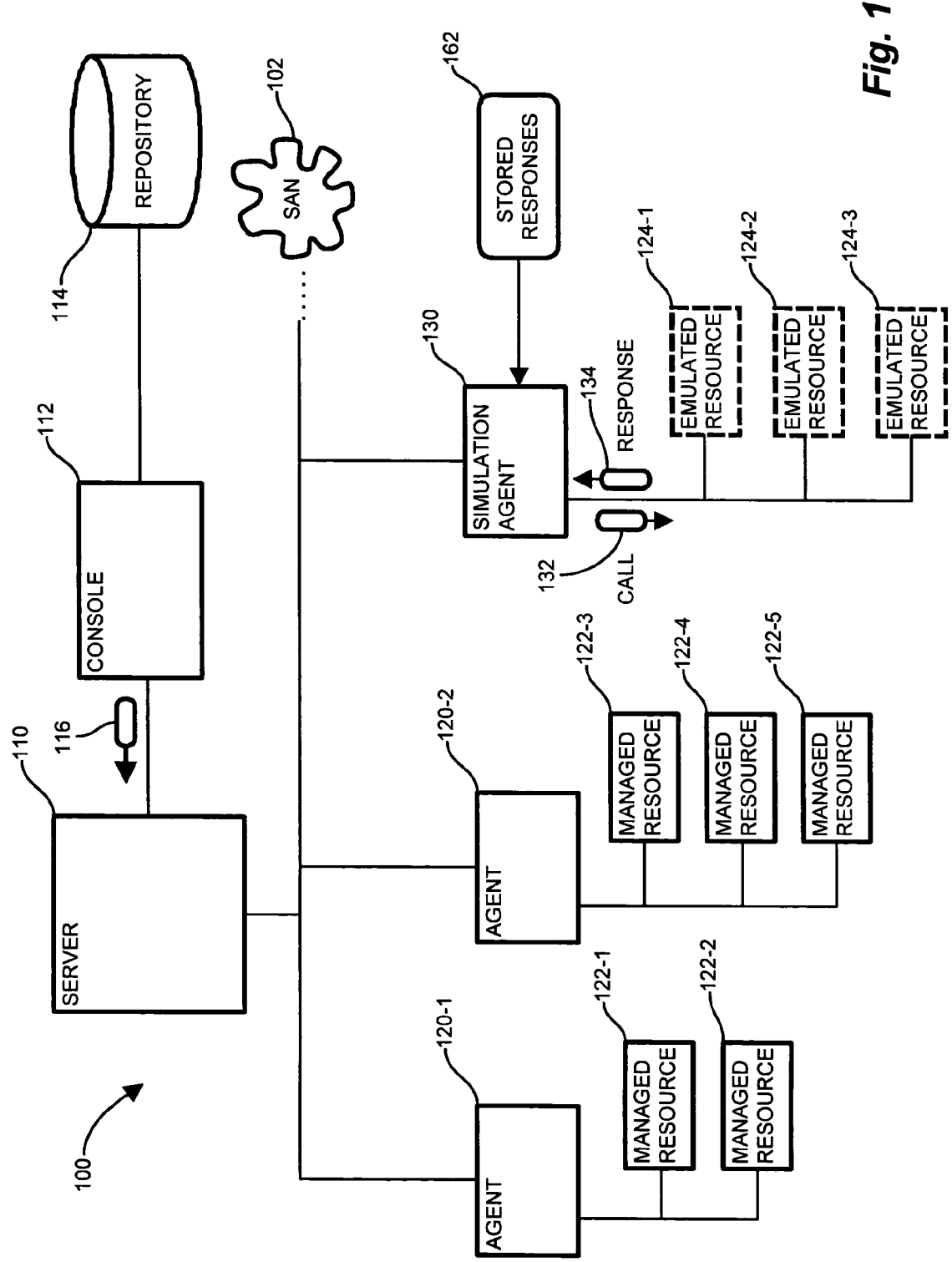
FIG. 1 is a context diagram of an exemplary managed information environment including a storage area network and suitable for use with configurations of the SAN simulator.

FIG. 1 is a context diagram of an exemplary managed information environment 100 including a storage area network 102 and suitable for use with configurations of the SAN simulator. Referring to FIG. 1, the managed information environment 100 includes a server 110 responsive to a user console 112 and coupled to a repository 114 operable to store configuration and connectivity data concerning various manageable entities, or manageable resources, interconnected in the storage area network 102. The server 110 receives commands 116 from the console 112, and effects the commands 116 via agents 120-1 . . . 120-N (120 generally) in the SAN 102. The exemplary environment 100 shows agents 120-1 and 120-2; additional agents are typically interconnected in the SAN 102. The agents 120 are typically software entities executing on hosts in the SAN 120 for maintaining and monitoring managed entities, or managed resources 122-1 . . . 122-5 (122 generally) in the SAN such as storage arrays, connectivity devices, such as switches, and databases. An agent 120 may manage a plurality of managed resources 122, typically having a common denominator such as a common vendor and/or type of manageable resource.

Typically, the agents 120 implement the commands 116 on behalf of the server 110 by invoking the managed resources 122 via the agents 120. For example, an exemplary managed resource 122 is a connectivity device, or switch. A switch typically interconnects storage arrays and hosts serving users via a plurality of ports. Often, in a test environment or scenario, it is beneficial to simulate the operation of the managed resources 122. For example, the managed resources 122 may encompass a substantial quantity of switches at a customer site, or a large number of storage arrays. Accordingly, a simulator agent 130 is operable to simulate one or more manageable resources 122 in the SAN 102.

The simulator agent 130 has access to stored responses indicative of the managed resource 122 to be simulated. The simulator agent 130 makes calls 132 responsive to the server 110, and returns responses 134 that simulate the emulated resource 124. In this manner, the simulator agent 130 and corresponding emulated resources 124-N duplicate scenarios involving many managed resources 122 in the SAN 102 without requiring actual deployment of the hardware. Such a simulation allows recreation of, for example, a particular customer site problem, which may be difficult to duplicate, in a controlled test environment for monitoring and debugging purposes.

Figure 2:
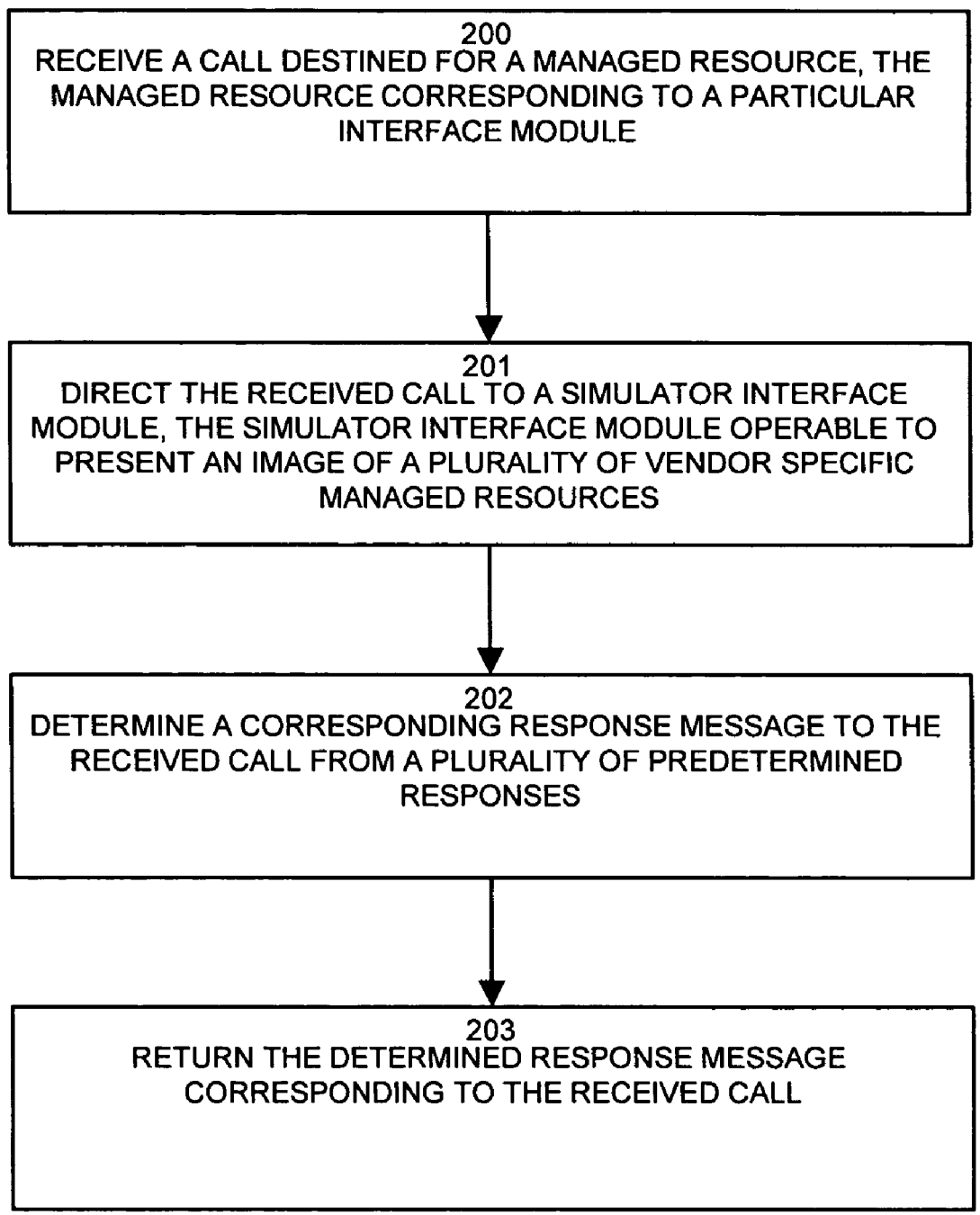
FIG. 2 is a flowchart of an agent employing the SAN simulator.

FIG. 2 is a flowchart of the server 110 employing the SAN simulation agent 130. Referring to FIGS. 1 and 2, the method of simulating nodes in a storage area network 102 includes receiving a call from an API destined for a managed resource 122, in which the managed resource 122-1 . . . 122-5 (122 generally), such as a switch, corresponds to a particular interface module (144, FIG. 3, below), as depicted at step 200. The simulated managed resource 122 may be any of the particular manageable entities in a SAN, such as storage arrays, connectivity devices, and hosts. In the particular exemplary arrangement discussed, the manageable resources 122 simulated are switches.

Through an interception mechanism discussed further below, the simulation agent 130 directs the received call to a simulator interface module 160 (FIG. 3, below) in the simulation agent 130, in which the simulation interface module 160 is operable to present an image of a plurality of vendor specific emulated managed resources 124-1 . . . 124-3 (124 generally), as shown at step 201. The simulator interface module 160 determines a corresponding response message 134 to the received call 132 from a plurality of predetermined, stored responses 162, as depicted at step 202. The stored response 162 is that which the emulated resource 124 would return in the case of a call to the actual manageable resource 122. The simulation agent 130 returns the determined response message 134 corresponding to the received call 132, thus presenting the image of the emulated resources 124 to appear as the managed resources 122 from the perspective of the invoking server 110. It should be noted that in the exemplary configuration, the simulation agent 130 appears to the SAN the same as a regular agent. The agent 130 does not even know whether it is running against real or simulated device. The agent 130 employs the API (SAN API) as the interface module 160, which can run in a simulated or real mode. The fact that the API is running in a simulated mode is hidden from the agent 120. In other words, the exemplary simulation agent 130 is an agent 120 having the simulation plug-in, or interface 160, as an available plug-in 144, and which is directed to focus message traffic to the emulator plug-in 160.

Figure 3:
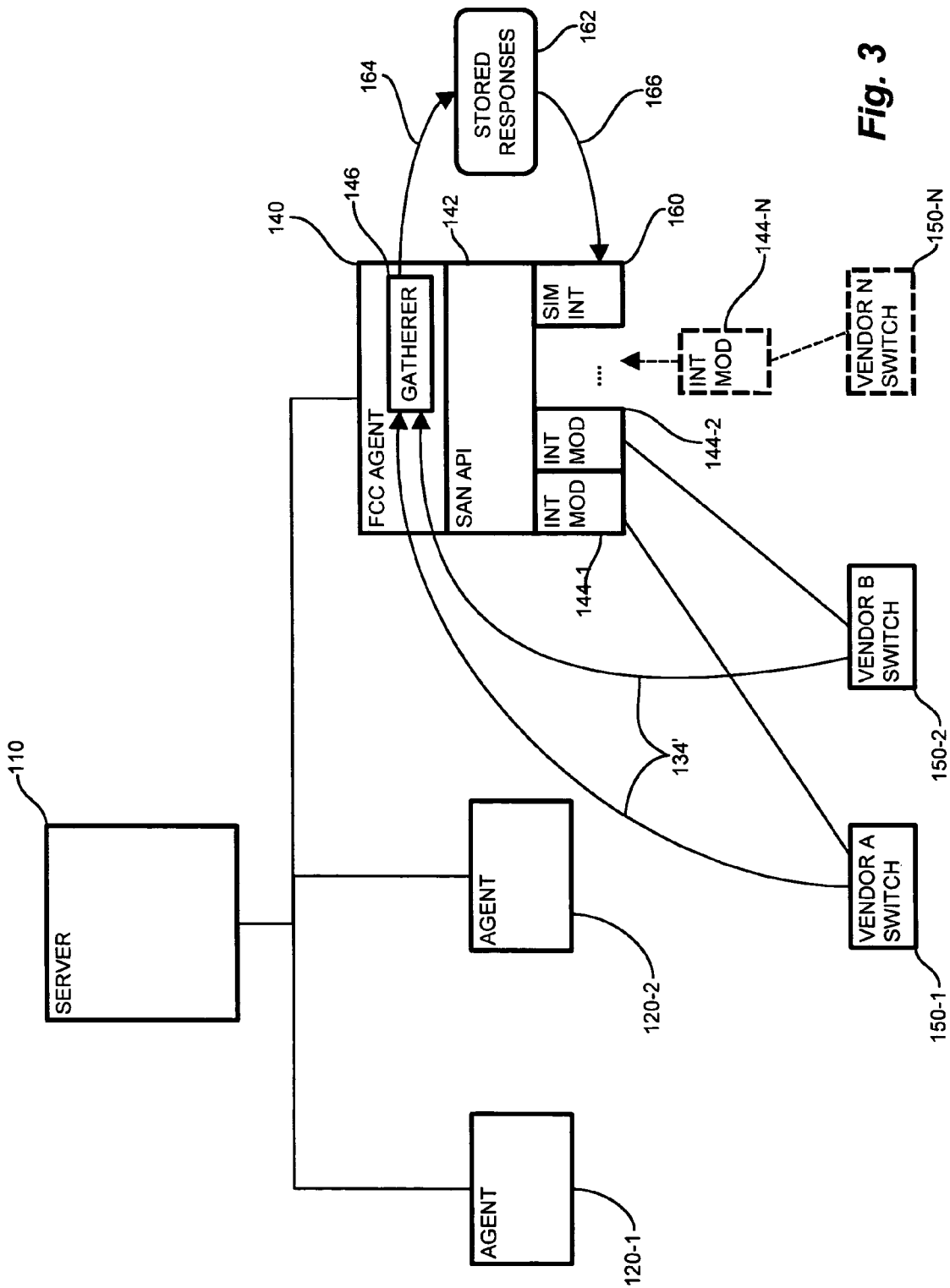
FIG. 3 is a block diagram of a particular configuration including a simulator interface.
Figure 4:
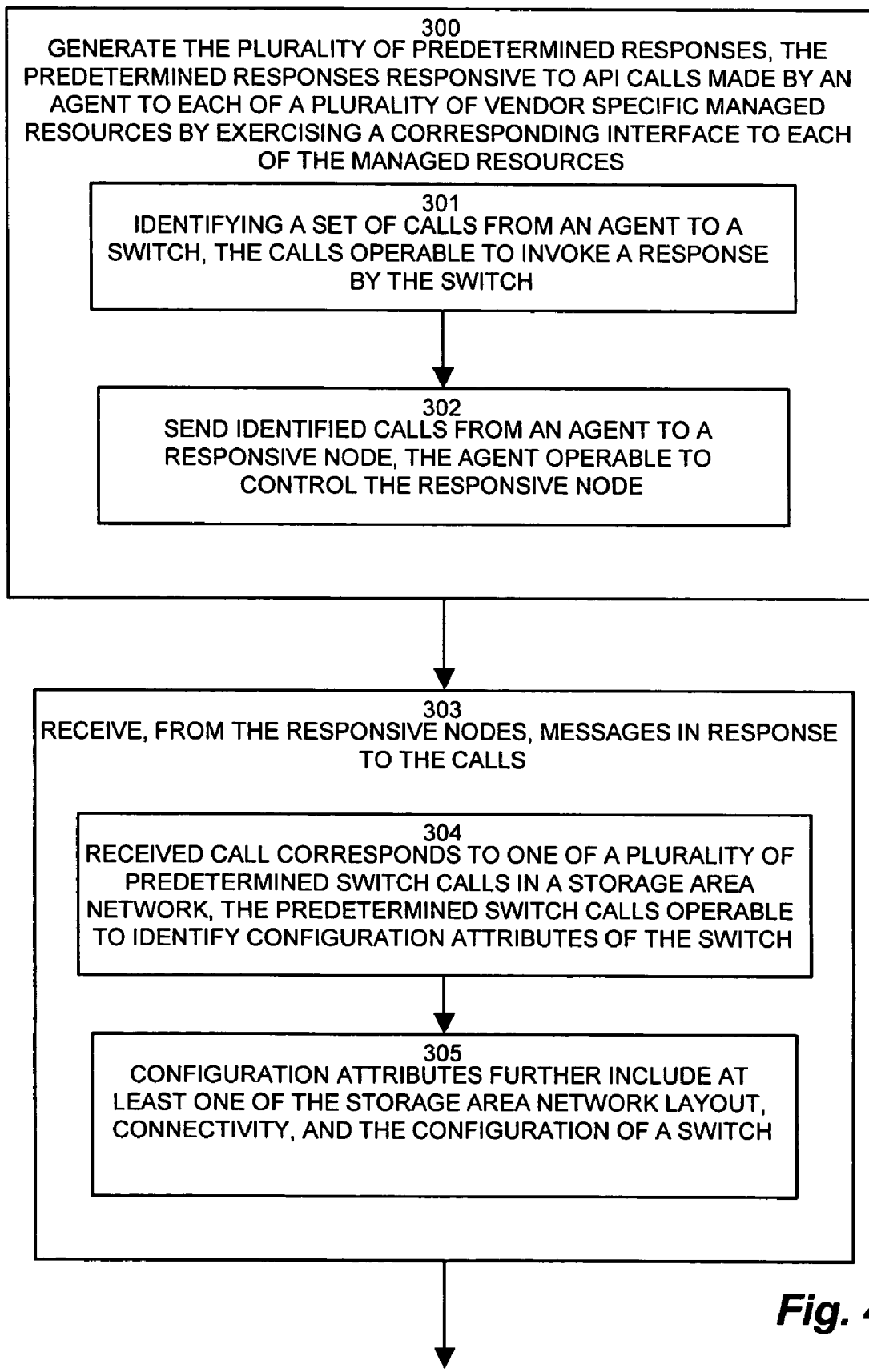
FIGS. 4-7 are a flowchart of the SAN simulator of FIG. 2 in greater detail employing the simulator interface of FIG. 3.
Figure 5:
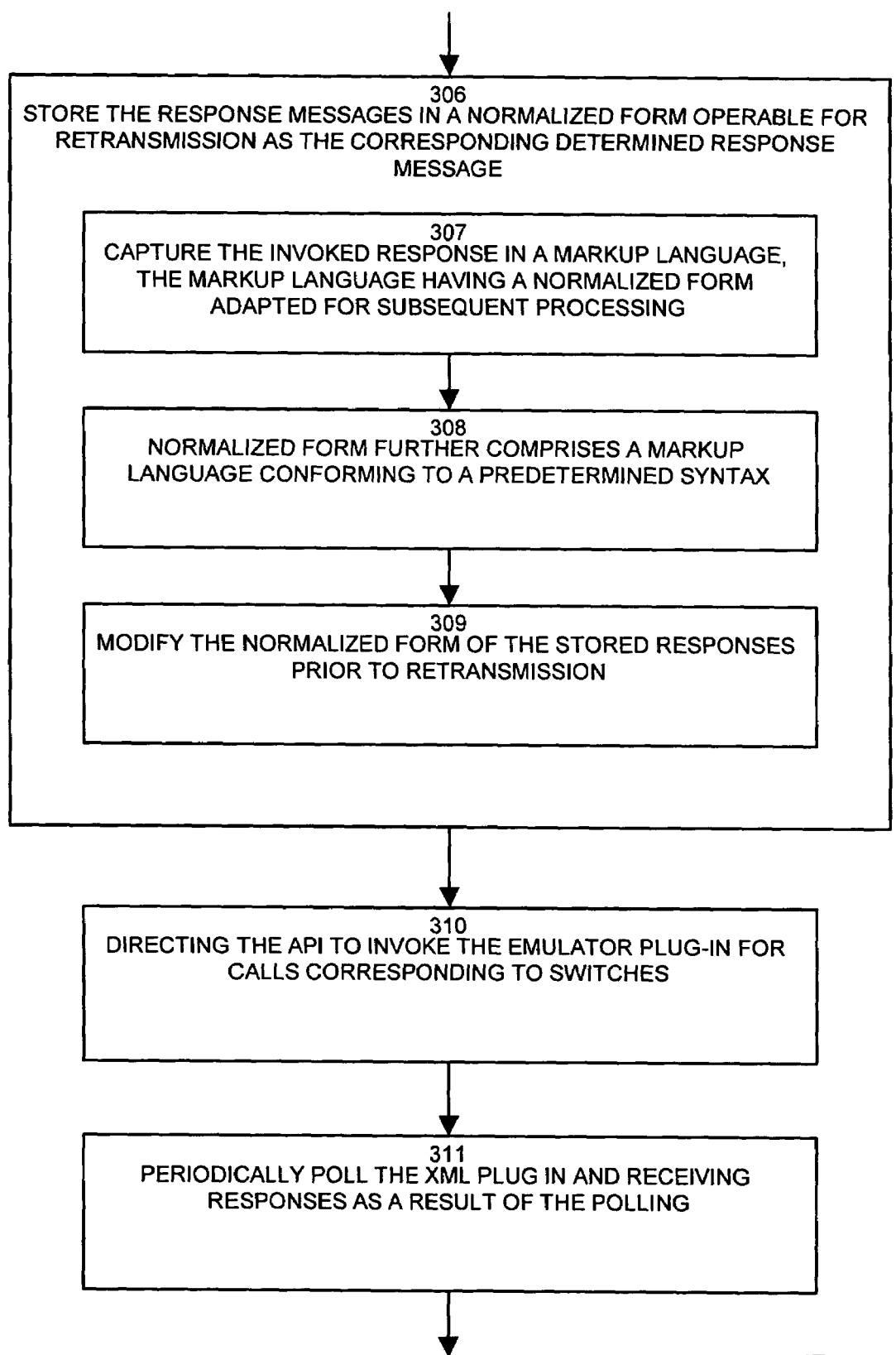
Figure 6:
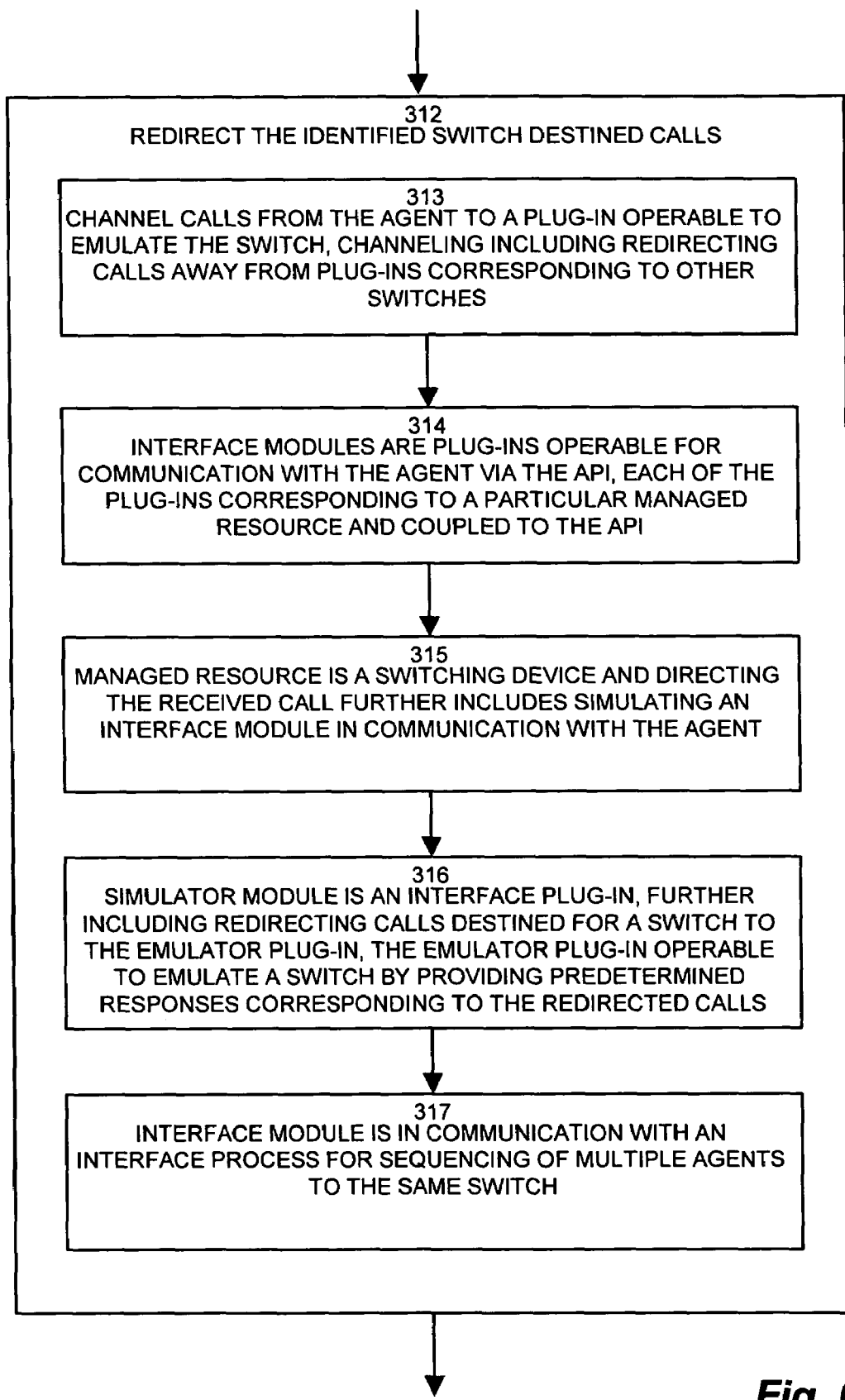
Figure 7:
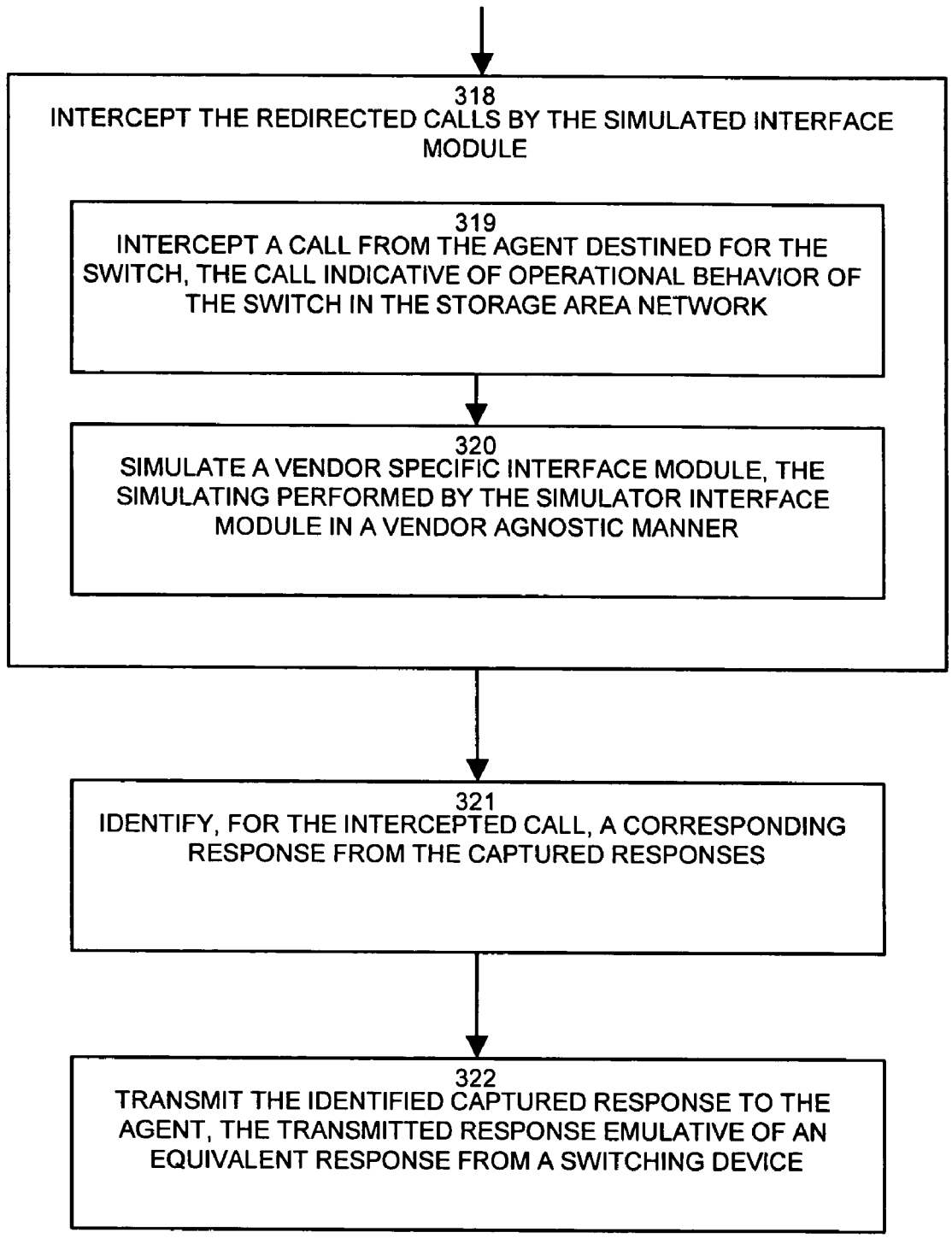

FIG. 3 is a block diagram of a particular configuration including a simulator interface. Referring to FIG. 3, an exemplary SAN 102 configuration is displayed employing switches 150-1 . . . 150-N (150 generally) as the managed resource 122 to be emulated and includes simulation of a fiber channel connectivity (FCC) agent 140 responsive to the server 110 for managing a plurality of switches 150-1 . . . 150-N (150 generally). The FCC agent 140 scenario is exemplary as an illustrative configuration. Alternate configurations may include other agent types and managed resource 122 types. The FCC agent 140 includes a SAN API 142 for communication with the switches 150. Since the types and vendors of the switches 150 varies, the SAN API employs an interface module 144-1 . . . 144-N (144 generally) for each particular vendor and type of switch. In a particular exemplary arrangement, the interface module 144 is a software plug-in, as is known in the art, specific to each expected switch 150 from a plurality of vendors. The interface modules 144, therefore, include vendor specific instructions and are responsive to general instructions from the SAN API 142 for exchanging vendor specific commands and information with each of the particular switches 150-N. Further, additional switches 150-N may be added by integrating an additional interface module 144-N specific to the additional switch, such as a switch of a new vendor 150-N. In this manner, the FCC agent 140 is operable to manage a plurality of different vendor switch types 150-N via the SAN API 142 integrated with different interface modules 144-N appropriate to the switches 150 to be managed.

The FCC agent 140 employs a gatherer 146 for accumulating responses 134 to calls 132 made to the switches 150. The gatherer 146 accumulates a set of stored responses 162 by exercising the interface to each of the switches 150-1 . . . 150-N via the corresponding interface module. For each of the expected calls 132, the corresponding response is gathered as the stored responses 162, as shown by arrow 164. In alternate configurations, gathering of the expected responses for accumulating the stored responses 162 may be performed by other suitable mechanisms, such as an external utility or toolkit.

Following gathering of the stored responses 162 from each of the interface modules, the SAN 102 simulation may commence using the stored responses 162 as predetermined responses by a simulation interface 160. The simulation interface module 160 emulates the switches 150-N or other emulated resource 124 by returning the corresponding predetermined response to each call 132 issued via the SAN API 142 on behalf of the server 110. The simulation interface 162 sets a flag or other indicator in the SAN API 142 which indicates that the simulator interface module 160 is to be employed for all calls rather than another interface module 144. In this manner, the calls 132 made via the SAN API 142 to any of a number of switches 150 are redirected to the simulator interface module 160 for the appropriate predetermined response from the stored responses 162 to be returned. The simulator interface module 160, therefore, provides a number of emulated resources 124-1 . . . 124-N which appear as a like number of switches 150-1 . . . 150-N to the server 110. Further, gathering the responses includes identifying the associated latency corresponding to a predetermined response, thereby allowing the interface module to selectively adjust the predetermined response according to the latency. In the actual SAN, a delay typically occurs between the call and the corresponding response. However, the interface module 160 may be operable to provide the predetermined response faster than the corresponding actual response which it is emulating. Accordingly, associating the predetermined responses with the appropriate latency present in the actual execution allows accurate duplication of system load and timing by preserving the latency associated with a particular call. Further details on computing the latency delay are disclosed in copending U.S. patent application Ser. No. 10/955,964, filed concurrently, entitled "SYSTEM AND METHODS FOR NETWORK CALL LOAD SIMULATION," assigned to the assignee of the present application and incorporated herein by reference.

FIGS. 4-7 are a flowchart of the SAN simulator of FIG. 2 in greater detail employing the simulator interface of FIG. 3. Referring to FIGS. 1 and 3-7, simulation of the SAN resources 124-N first includes generating the plurality of predetermined responses as the stored responses 162, in which the predetermined responses are responsive to API calls 132 made by an agent 130, such as the exemplary FCC agent 140, to each of a plurality of vendor specific managed resources 124, such as switches 150-N, by exercising a corresponding interface 142 to each of the managed resources 122, as depicted at step 300. Gathering the stored responses 162 includes identifying a set of calls 132 from the agent 130 to a switch 150-1 . . . 150-N, in which the calls 132 are operable to invoke a response 134 by the switch, shown by arrows 134,' as shown at step 301. Accordingly, the gatherer 146 sends the identified calls 132 from the agent to a responsive node, in which the agent 140 is operable to control each of the responsive nodes 150-N, as depicted at step 302.

The gatherer 146 sends each of the expected calls to each of the vendors and types for which it is responsible, and receives, from each of the responsive nodes (i.e. switches 150), messages 134' in response to the calls 132, as shown at step 303. The calls exercise each of the expected calls for each of the different vendor's switches 150-1 . . . 150-N, and accordingly, each of the received calls 132 correspond to one of a plurality of predetermined switch calls in the storage area network 102, in which the predetermined switch calls 132 are operable to identify configuration attributes of the switch 150-N, as shown at step 304. The configuration attributes specified in the responses 134' further include one or more of parameters pertaining to the storage area network layout, connectivity, and the configuration of a switch 150, as depicted at step 305. In this manner, the gatherer 146 evokes a response 146' for each of the responses 134 expected from the switches 150-N to be emulated.

Once received, the gatherer 146 stores the response messages 134 in a normalized form as the stored responses 162, shown by arrow 164, operable for retransmission as the corresponding determined response message 134 from an emulated resource 124-N, as depicted at step 306. In the exemplary configuration, the gatherer 146 captures the invoked response 134 in a markup language, in which the markup language has a normalized form adapted for subsequent processing, as disclosed at step 307. Such a normalized form further comprises a markup language conforming to a predetermined syntax, such as Extensible Markup Language (XML), as shown at step 308. The XML form of the stored responses 162 allows modification the normalized form of the stored responses prior to retransmission, as shown at step 309, and also facilitates other processing such as storage, transmission, and indexing. Therefore, the stored responses 162 provide a portable representation of the switches 150 in the SAN 102 which effectively duplicates the configuration from which the gatherer 146 collected the responses 134, and allows simulation and further modification based on the captured configuration.

Once the stored responses are captured, the FCC agent 140 instructs the SAN API 142 to redirect calls 132 to employ the stored responses. Redirecting further includes, therefore, directing the API 142 to invoke the emulator plug-in 160 for calls corresponding to the switches 150, as shown at step 310. Typically, such redirecting involves a control structure, such as a flag, in the agent so that the simulator interface module 160 is employed instead of the device specific interface modules 144-N. Once redirection is in place, the API 142 watches for calls to the switches 150, or managed resources 122, for redirection. In the exemplary arrangement, identifying the managed resource calls 132 further comprise periodically polling the XML plug in representing the simulation interface 160 and receiving responses as a result of the polling as shown at step 311.

Once polling or another suitable mechanism receives the calls, the API 142 redirecting the identified switch 150 destined calls 132, as depicted at step 312. Redirecting the calls 132 further includes channeling calls from the agent 140 to a plug-in 160 operable to emulate the switch 150, channeling including redirecting calls away from the plug-ins, or interface modules, 144-N corresponding to other switches 150, as shown at step 313. As indicated above, in the exemplary arrangement, the interface modules 144 are plug-ins operable for communication with the agent 140 via the API 142, in which each of the plug-ins corresponds to a particular managed resource 122 such as a switch 150 and coupled to the API 142 via the interface modules 144, as depicted at step 314. In the exemplary configuration, the managed resource 122 is a switching device 150, and directing the received call further includes simulating an interface module 144 in communication with the agent 140 using the simulator interface module 160, as depicted at step 315. The simulator module 160 is an interface plug-in, similar to the interface modules 144, and the API 142 redirects calls destined for a switch to the emulator plug-in 160, the emulator plug-in 160 operable to emulate a switch by providing predetermined responses 162 corresponding to the redirected calls 132, as disclosed at step 316. In further configurations, the interface module is in communication with an additional interface process (not specifically shown) for sequencing of multiple agents 140 to the same switch 150. In particular configurations, call 132 load to a plurality of switches 150 creates a concurrency situation requiring queuing of pending calls 132, as depicted at step 317. In such a scenario, simulation may include the additional load related latency timing and other parameters resulting from queuing of calls 132. Handling of such queuing is described further in the copending US patent application cited above.

The simulated interface module 160 intercepts the redirected calls, as depicted at step 318, and accordingly receives the calls 132 from the agent 140 destined for the switch 150, in which the calls 132 are indicative of operational behavior of the switch 150 in the storage area network 102, as shown at step 319. Since each of the interface modules 144-1 . . . 144-N is specific to a switch of a particular vendor, intercepting by the simulator interface module 160 further includes simulating a vendor specific interface module 144, in which the simulating is performed by the simulator interface module 162 in a vendor agnostic manner, as shown at step 320. The simulator interface module 162, therefore, adapts to the SAN API 142 as the other interface modules 144, and intercepts, or captures the calls 132 destined for the other interface modules 144 such that the actual switches 150 need not be present are simulated as emulated resources 124-N by the simulator interface module 162.

The simulator interface module 162 identifies, for the intercepted call 132, a corresponding response from the stored responses 162 captured by the gatherer, as shown by arrow 166. The simulator interface module 162 then transmitting the identified captured response to the agent 140 as a response 134, in which transmitted response emulative of an equivalent response from a switching device 150, thereby enabling the simulator interface to effectively operate as an emulated resource 124 for a plurality of switches 150 or other managed resources 122 in the SAN 102.

The SAN simulation framework and mechanism disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for storage area network simulation as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for storage area network simulation has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of simulating nodes in a storage area network comprising:
receiving a call destined for a managed resource, the managed resource corresponding to a particular interface module;
directing the received call to a simulator interface module, the simulator interface module operable to present an image of a plurality of vendor specific managed resources;
determining a corresponding response message to the received call from a plurality of predetermined responses; and
returning the determined response message corresponding to the received call, further comprising:
storing the response messages in a normalized form operable for retransmission as the corresponding determined response message, the normalized form further comprising a markup language conforming to a predetermined syntax; and
modifying the normalized form of the stored responses prior to retransmission.

2. The method of claim 1 further comprising generating the plurality of predetermined responses, the predetermined responses responsive to API calls made by an agent to each of a plurality of vendor specific managed resources by exercising a corresponding interface to each of the managed resources.

3. The method of claim 2 wherein the managed resource is a switching device and directing the received call further comprises:
simulating an interface module in communication with the agent;
redirecting the identified switch destined calls; and
intercepting the redirected calls by the simulated interface module.

4. The method of claim 3 wherein intercepting further comprises simulating a vendor specific interface module, the simulating performed by the simulator interface module in a vendor agnostic manner.

5. The method of claim 1 wherein establishing the predetermined responses further comprises:

identifying calls made by an agent to a responsive node, the agent operable to control the responsive node;

receiving, from the responsive nodes, messages in response to the calls, wherein the received calls correspond to one of a plurality of predetermined switch calls in a storage area network, the predetermined switch calls operable to identify configuration attributes of the switch, the configuration attributes further including at least one of the storage area network layout, connectivity, and the configuration of a switch.

6. The method of claim 1 further comprising a plurality of interface modules, the interface modules being interface plug-ins operable for communication with the agent via the API, each of the interface plug-ins corresponding to a particular managed object and coupled to the API, wherein the simulator module is an interface plug-in, further comprising redirecting calls destined for a switch to the simulator plug-in, the simulator plug-in operable to emulate a switch by providing predetermined responses corresponding to the redirected calls.

7. The method of claim 6 wherein the predetermined responses are further indicative of a latency, further comprising:

identifying the latency corresponding to a predetermined response; and adjusting the predetermined response according to the latency, the latency based on a delay between the call and the response such that the predetermined response encounters a delay corresponding to an actual response from which it was captured, redirecting further comprising directing the API to invoke the simulator plug-in for calls corresponding to switches, identifying the managed object calls further comprising periodically polling the XML simulator plug in and receiving responses as a result of the polling, wherein the interface module is in communication with an interface process for sequencing of multiple agents to the same switch.

8. A method for emulating a switching device in a storage area network comprising:

identifying a set of calls from an agent to a switch, the calls operable to invoke a response by the switch;

capturing the invoked response in a markup language, the markup language having a normalized form adapted for subsequent processing, the normalized form defined by a markup language conforming to a predetermined syntax;

channeling calls from the agent to a plug-in operable to emulate the switch, channeling including redirecting calls away from plug-ins corresponding to other switches;

intercepting a call from the agent destined for the switch, the call indicative of operational behavior of the switch in the storage area network;

identifying, for the intercepted call, a corresponding response from the captured responses;

transmitting the identified captured response to the agent, the transmitted response emulative of an equivalent response from a switching device; and intercepting a plurality of calls and, for each of the intercepted calls, identifying and transmitting a corresponding equivalent response.

9. A storage area network simulator device responsive to a set of processor based instructions on a computer readable storage medium comprising:

an application programming interface operable to receive a call destined for a managed resource, the managed resource corresponding to a particular interface module;

a simulator interface module having a reroute mechanism operable to direct the received call to the simulator interface module, the simulator interface module operable to present an image of a plurality of vendor specific managed resources, the simulator interface module operable to determine a corresponding response message to the received call from a plurality of predetermined responses, the simulator interface module further operable to return the determined response message corresponding to the received call;

a gatherer operable to:

generate the plurality of predetermined responses, the predetermined responses responsive to API calls made by an agent; and store the response messages in a normalized form operable for retransmission as the corresponding determined response message, wherein the received call corresponding to one of a plurality of predetermined switch calls in a storage area network, the predetermined switch calls operable to identify configuration attributes of the switch, the normalized form defined by a markup language conforming to a predetermined syntax such the configuration attributed further include at least one of:

the storage area network layout;

connectivity; and the configuration of a switch, the agent further operable to modify the normalized form of the stored responses prior to retransmission, the simulator module being an interface plug-in, further operable to redirect calls destined for the switch to the emulator plug-in, the emulator plug-in operable to emulate a switch by providing the predetermined responses corresponding to the redirected calls.

10. The simulator device of claim 9 wherein the predetermined responses are responsive to API calls made by an agent to each of a plurality of vendor specific managed resources by exercising a corresponding interface to each of the managed resources.

11. The simulator device of claim 10 wherein the managed resource is a switching device, the simulator interface module further operable to:

simulate an interface module in communication with the agent;

redirect the identified switch destined calls; and intercept the redirected calls by the simulated interface module.

12. The simulator device of claim 11 wherein the simulator interface module is further operable to simulate a vendor specific interface module, the simulating performed by the simulator interface module in a vendor agnostic manner.

13. The simulator device of claim 9 wherein the gatherer is operable to:

identify calls made by an agent to a responsive node, the agent operable to control the responsive node; and receive, from the responsive nodes, messages in response to the calls.

14. The simulator device of claim 13 wherein the simulator module is an interface plug-in, and is further operable to redirect calls destined for a switch to the emulator plug-in, the emulator plug-in operable to emulate a switch by providing predetermined responses corresponding to the redirected calls.

15. The simulator device of claim 9 wherein interface modules are plug-ins operable for communication with the agent via the API, each of the plug-ins corresponding to a particular managed object and coupled to the API, the predetermined responses further including a latency, wherein the emulator plug in is operable to adjust the predetermined response according to the latency.

16. The simulator device of claim 15 wherein the simulator interface module is further operable to direct the API to invoke the emulator plug-in for calls corresponding to switches, the API further operable to periodically poll the XML plug in and receive responses as a result of the polling, wherein the interface module is in communication with an interface process for sequencing of multiple agents to the same switch.

17. A computer program product having a computer readable storage medium operable to store computer program logic embodied in computer program code encoded thereon for execution by a processor for simulating nodes in a storage area network comprising:
    computer program code for receiving a call destined for a managed resource, the managed resource corresponding to a particular interface module;
    computer program code for directing the received call to a simulator interface module, the simulator interface module operable to present an image of a plurality of vendor specific managed resources;
    computer program code for determining a corresponding response message to the received call from a plurality of predetermined responses;
    computer program code for capturing the plurality predetermined responses in a markup language, the markup language having a normalized form adapted for subsequent processing;
    and
    computer program code for returning the determined response message corresponding to the received call.

18. A simulator device for simulating nodes in a storage area network comprising:
    means for receiving a call destined for a managed resource, the managed resource corresponding to a particular simulator interface module, the simulator interface modules being emulator plug-ins operable for communication with an agent via an API (Application Programming Interface), the emulator plug-in corresponding to a particular managed object and coupled to the API;
    means for directing the received call to a simulator interface module, the simulator interface module operable to present an image of a plurality of vendor specific managed resources;
    means for directing the API to invoke the emulator plug-in for calls corresponding to switches, the API further operable to periodically poll the XML plug-in and receive responses as a result of the polling, wherein the interface module is in communication with an interface process for sequencing of multiple agents to the same switch
    means for determining a corresponding response message to the received call from a plurality of predetermined responses; and
    means for returning the determined response message corresponding to the received call.

* * * * *